(12) United States Patent
Yang (10) Patent No.: US 11,428,149 B2
(45) Date of Patent: Aug. 30, 2022

(54) COOLING DEVICE FOR IN-WHEEL MOTOR AND CONTROL METHOD THEREOF

(71) Applicant: HYUNDAI MOBIS CO., LTD., Seoul (KR)

(72) Inventor: Hae Jun Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 375 days.

(21) Appl. No.: 16/590,522

(22) Filed: Oct. 2, 2019

(65) Prior Publication Data
US 2020/0109658 A1 Apr. 9, 2020

(30) Foreign Application Priority Data

Oct. 5, 2018 (KR) .................. 10-2018-0118914

(51) Int. Cl.
| | |
|---|---|
| *G06G 7/70* | (2006.01) |
| *F01P 11/08* | (2006.01) |
| *H02K 9/19* | (2006.01) |
| *B60K 7/00* | (2006.01) |
| *F01P 7/14* | (2006.01) |

(52) U.S. Cl.
CPC ............ *F01P 11/08* (2013.01); *B60K 7/0007* (2013.01); *H02K 9/19* (2013.01); *F01P 2007/146* (2013.01)

(58) Field of Classification Search
CPC ... F01P 11/08; F01P 2007/146; B60K 7/0007; H02K 9/19
USPC ......................................................... 701/102
See application file for complete search history.

(56) References Cited

U.S. PATENT DOCUMENTS

| | | | | |
|---|---|---|---|---|
| 8,720,623 B1* | 5/2014 | Kim | .................. | B60K 11/02 |
| | | | | 180/65.51 |
| 8,925,514 B2 | 1/2015 | Bowman | | |
| 2007/0199339 A1* | 8/2007 | Ishihara | ............... | B60K 7/0007 |
| | | | | 62/242 |
| 2009/0236158 A1* | 9/2009 | Sakuma | ............... | B60K 7/0007 |
| | | | | 180/65.51 |
| 2013/0062466 A1* | 3/2013 | Sweet | ................... | B60K 7/0007 |
| | | | | 244/103 R |
| 2013/0118425 A1 | 5/2013 | Bowman | | |
| 2014/0132058 A1 | 5/2014 | Kim | | |
| 2017/0058975 A1* | 3/2017 | Szewczyk | ............. | B60B 25/004 |
| 2017/0324297 A1* | 11/2017 | Furuuchi | .................. | B60K 7/00 |

FOREIGN PATENT DOCUMENTS

| | | |
|---|---|---|
| DE | 102012220495 | 5/2013 |
| DE | 102013201441 | 5/2014 |

\* cited by examiner

*Primary Examiner* — Hung Q Nguyen
*Assistant Examiner* — Anthony Donald Taylor, Jr.
(74) *Attorney, Agent, or Firm* — H.C. Park & Associates, PLC (57) ABSTRACT

A cooling device for an in-wheel motor may include: a cooling circuit configured to form a flow path of oil in an in-wheel motor; an oil tank connected to the cooling circuit, and configured to supply oil to the cooling circuit or store oil from the cooling circuit; a valve installed on a pipeline connecting the cooling circuit to the oil tank, and configured to control movement of oil according to a control signal; and a controller configured to receive a traveling condition of a vehicle and a temperature of the in-wheel motor, and transmit a control signal to control the operation of the valve and adjust the amount of oil flowing through the cooling circuit.

9 Claims, 7 Drawing Sheets

COOLING DEVICE FOR IN-WHEEL MOTOR AND CONTROL METHOD THEREOF

CROSS-REFERENCES TO RELATED APPLICATIONS

This application claims priority from and the benefit of Korean Patent Application No. 10-2018-0118914, filed on Oct. 5, 2018, which is hereby incorporated for all purposes as if set forth herein.

BACKGROUND OF THE INVENTION

Field

Exemplary embodiments relate to a cooling device for an in-wheel motor and control methods, and more particularly to cooling devices for in-wheel motors, which can cool an in-wheel motor by controlling the amount of oil circulating through the in-wheel motor according to a traveling condition of a vehicle and thus improve cooling efficiency, and a control method thereof.

Discussion of the Background

In general, an in-wheel driving system is mounted on each wheel and serves to generate power. In a vehicle which is driven by electric power, such as a hybrid vehicle, a fuel cell vehicle or an electric vehicle, a motor is mounted on each wheel to generate power, instead of using a single large-size motor.

Since the in-wheel driving system includes an in-wheel motor installed on each wheel, a vehicle including the in-wheel driving system has a simpler driving system than a vehicle including a large-size driving motor. Therefore, the vehicle including the in-wheel driving system can have a large interior space, and directly control the rotation of each wheel, which makes it possible to remove a complex power transmission device such as a differential gear system.

In the in-wheel motor according to the related art, Joule's heat is generated by a resistor while a current flows through an internal coil serving as a stator coil. When the temperature of the internal coil rises by 10° C. or more from an appropriate temperature, a desired lifetime of an in-wheel motor insulating part may be reduced to a half or less, thereby having a bad influence on the endurance and performance of the motor. Therefore, there is a need for a structure capable of solving the problem.

The above information disclosed in this Background section is only for enhancement of understanding of the background of the invention and, therefore, it may contain information that does not constitute prior art.

SUMMARY

Exemplary embodiments of the present invention provide a cooling device for an in-wheel motor, which can cool an in-wheel motor by controlling the amount of oil circulating through the in-wheel motor according to a traveling condition of a vehicle and thus improve cooling efficiency, and a control method thereof.

In one exemplary embodiment, a cooling device for an in-wheel motor may include: a cooling circuit configured to form a flow path of oil in an in-wheel motor; an oil tank connected to the cooling circuit, and configured to supply oil to the cooling circuit or store oil from the cooling circuit; a valve installed on a pipeline connecting the cooling circuit to the oil tank, and configured to control movement of oil according to a control signal; and a controller configured to receive a traveling condition of a vehicle and a temperature of the in-wheel motor and control the operation of the valve, and adjust the amount of oil flowing through the cooling circuit.

The cooling circuit may include: a hollow flow path having a hollow portion formed in the longitudinal direction of a motor shaft, such that oil is moved therethrough; and a supply flow path diverging from the hollow flow path so as to supply oil to a decelerator and a stator of the in-wheel motor.

The cooling device may further include: a first measurement unit configured to measure the temperature of the in-wheel motor and transfer the measurement value to the controller; and a second measurement unit configured to measure a traveling speed and traveling state of the vehicle, and transfer the measurement values to the controller.

The valve may include: an inlet valve configured to control a flow of oil moved from the in-wheel motor toward the oil tank; and an outlet valve configured to control a flow of oil moved from the oil tank toward the in-wheel motor.

When the temperature of the in-wheel motor is higher than a preset temperature, the controller may send the control signal to close the inlet valve and to open the outlet valve.

When the temperature of the in-wheel motor is lower than the preset temperature, the controller may send the control signal to open the inlet valve and to close the outlet valve.

The cooling device may further include an oil pump connected to the cooling circuit, operated by the control signal of the controller, and configured to force oil to circulate through the cooling circuit.

In another exemplary embodiment, a control method of a cooling device for an in-wheel motor may include: a first sensing step of sensing a state of a vehicle; a second sensing step of sensing a traveling condition of the vehicle and a temperature of an in-wheel motor; a first calculation step in which a controller calculates the amount of oil to cool the in-wheel motor; a second calculation step in which the controller calculates operation times of an inlet valve and an outlet valve which are installed on a pipeline connecting the in-wheel motor to an oil tank; and a valve operation step in which the operations of the inlet valve and the outlet valve are controlled by a control signal of the controller.

When the temperature of the in-wheel motor is higher than a preset temperature, the controller may send the control signal to close the inlet valve and to open the outlet valve.

When the temperature of the in-wheel motor is lower than the preset temperature, the controller may send the control signal to open the inlet valve and to close the outlet valve.

In the cooling device for an in-wheel device and the control method thereof in accordance with the embodiments of the present invention, the controller may control the operation of the valve connected to the oil tank according to the traveling condition of the vehicle. Thus, the amount of oil circulating through the in-wheel motor may be automatically adjusted to cool the in-wheel motor, which makes it possible to improve the endurance of the parts and the cooling efficiency of the in-wheel motor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incor

DESCRIPTION OF THE ILLUSTRATED EMBODIMENTS

In the following description, for the purposes of explanation, numerous specific details are set forth in order to provide a thorough understanding of various exemplary embodiments or implementations of implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the scope of the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, regions, and/or aspects, etc. (hereinafter individually or collectively referred to as "elements"), of the various embodiments may be otherwise combined, separated, interchanged, and/or rearranged without departing from the scope of the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element or layer, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules, such as the disclosed controller. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereafter, a cooling device for an in-wheel motor and a control method thereof in accordance with an embodiment of the inventive concepts will be described in detail with reference to the accompanying drawings.

Figure 1:
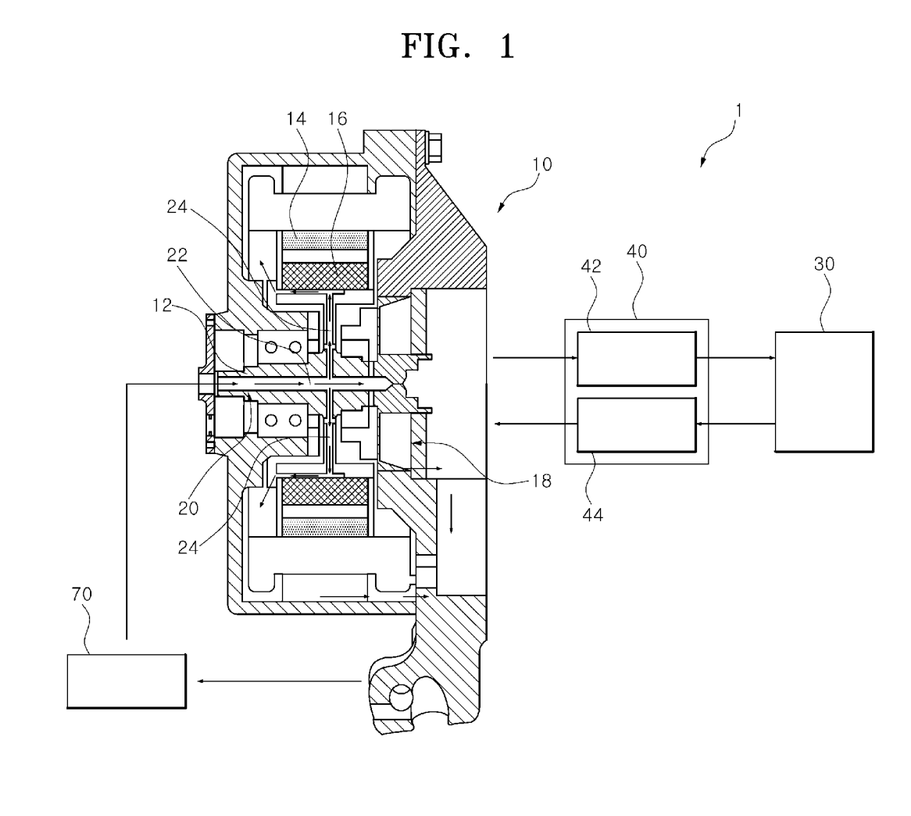
- FIG. 1 is a diagram schematically illustrating a cooling device for an in-wheel motor in accordance with an exemplary embodiment of the inventive concepts.
Figure 2:
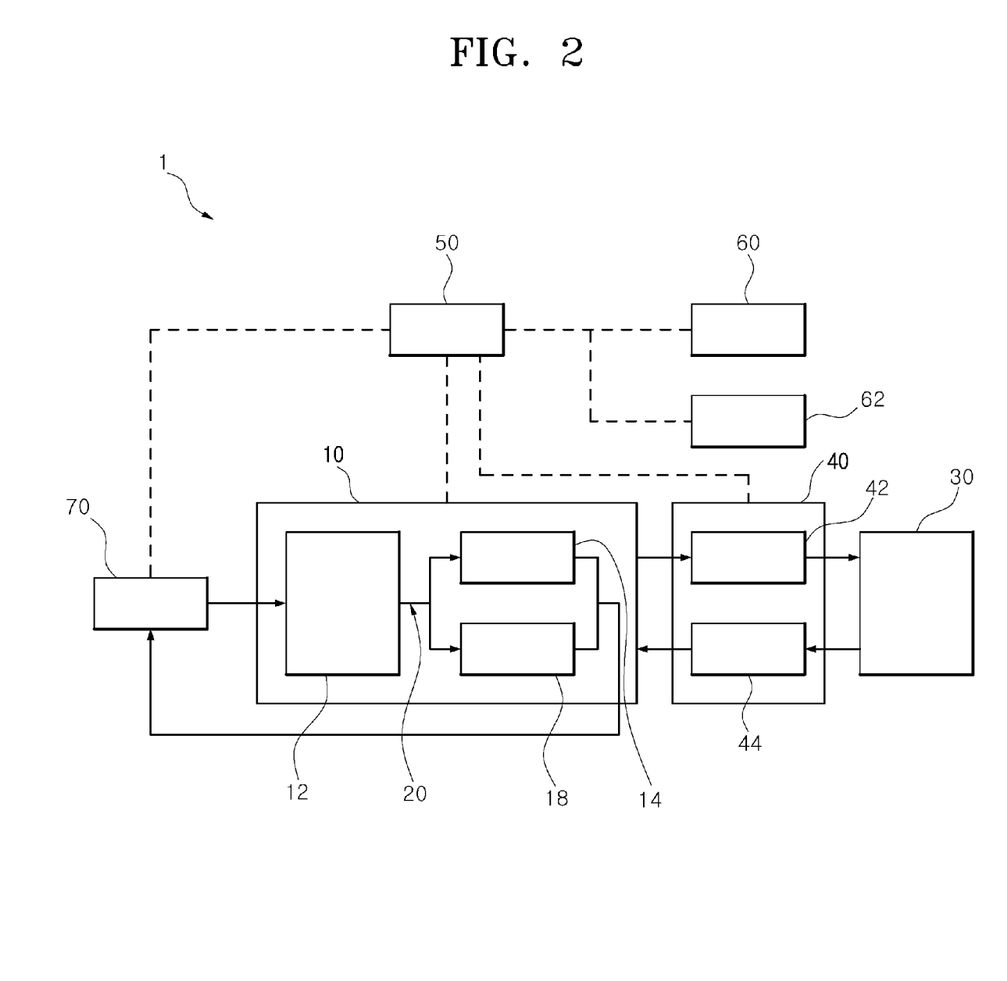
FIG. 2 is a block diagram illustrating the cooling device for an in-wheel motor in accordance with the exemplary embodiment.
Figure 3:
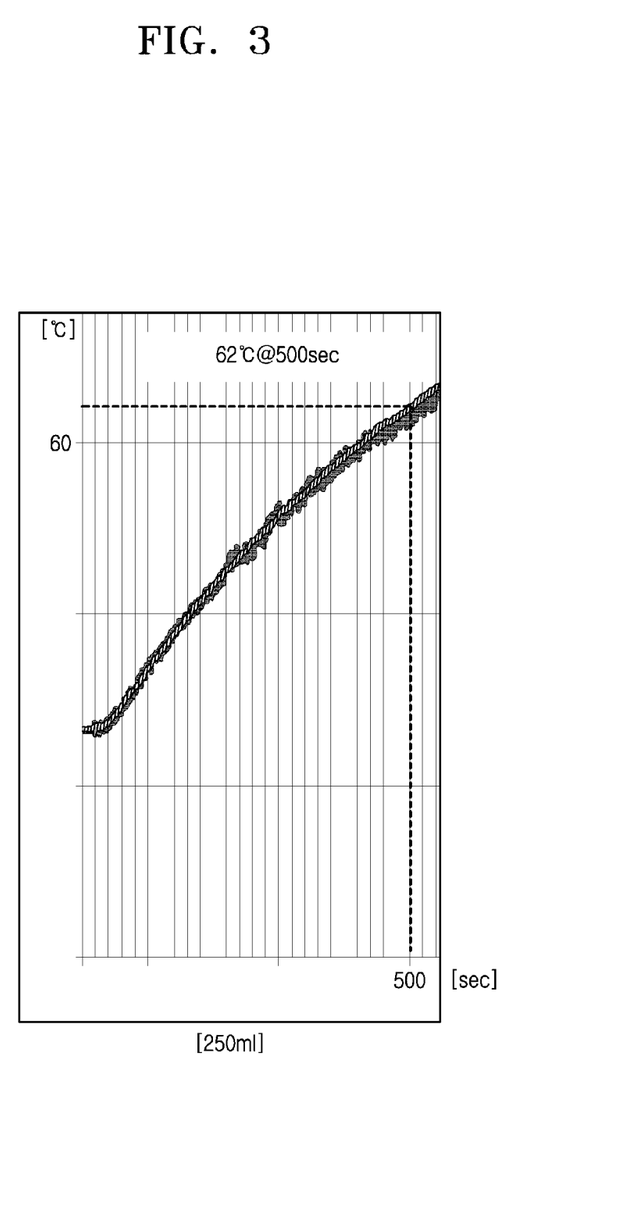
FIG. 3 is a graph illustrating cooling performance when the amount of oil in the in-wheel motor in accordance with the exemplary embodiment is 250 ml.
Figure 4:
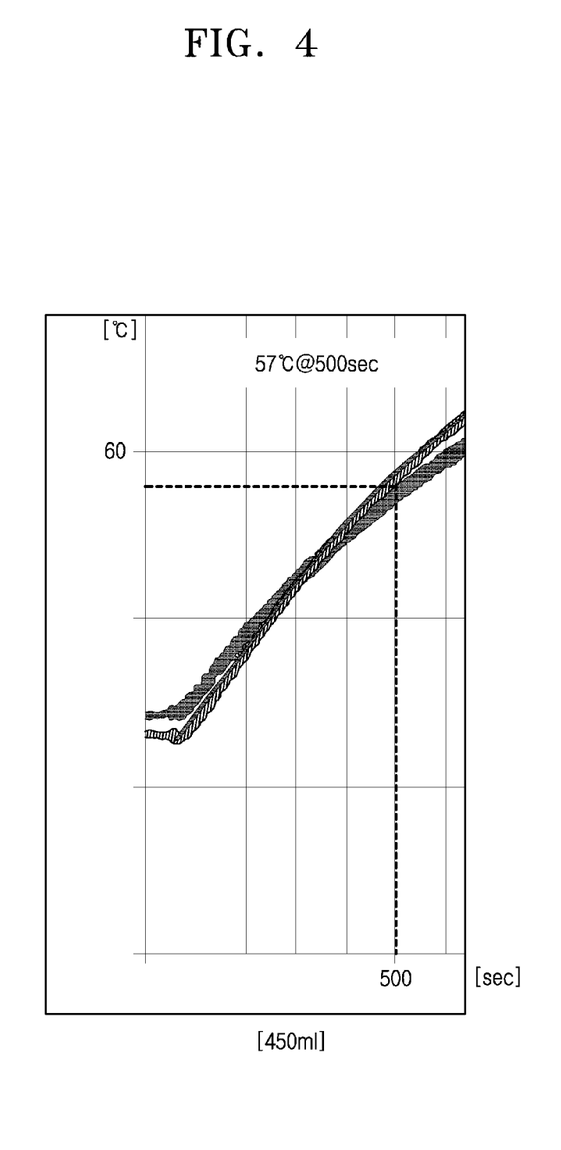
FIG. 4 is a graph illustrating cooling performance when the amount of oil in the in-wheel motor in accordance with the exemplary embodiment is 450 ml.
Figure 5:
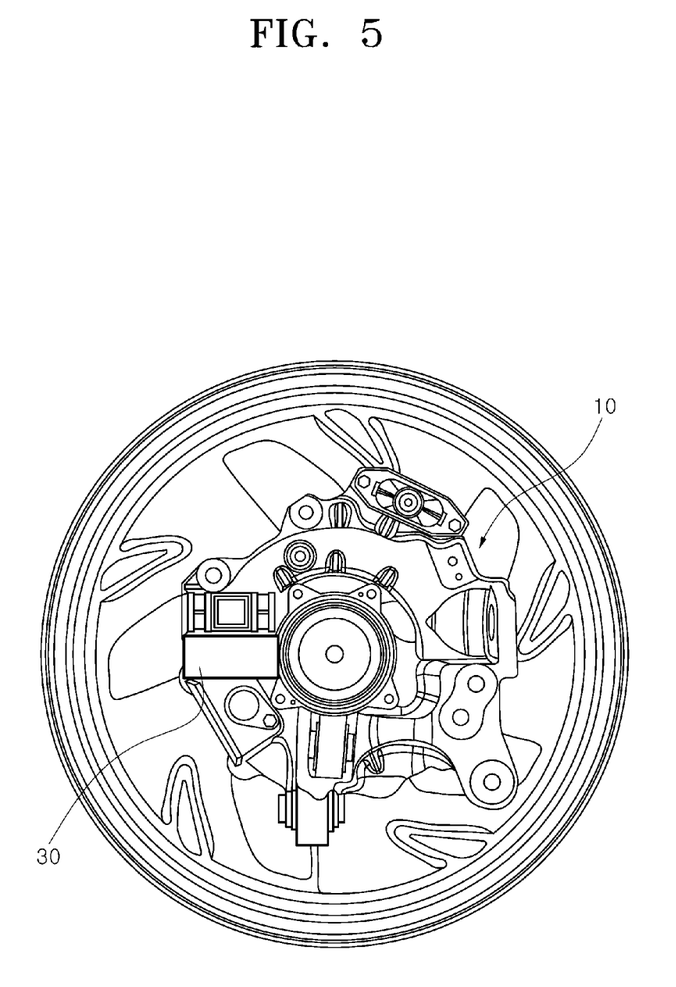
FIGS. 5 and 6 are diagrams illustrating the position where an oil tank in accordance with the exemplary embodiment is installed.
Figure 6:
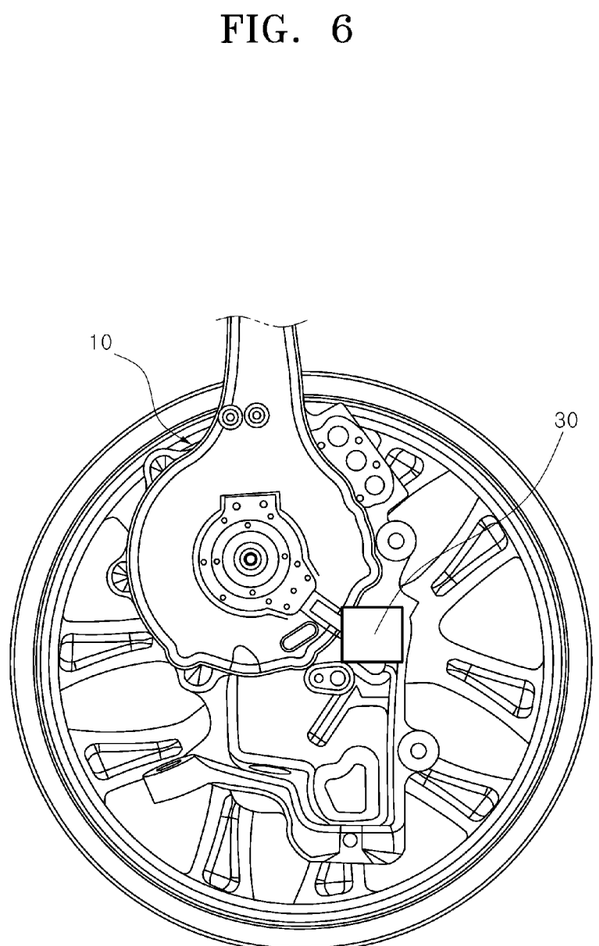

FIG. 1 is a diagram schematically illustrating a cooling device for an in-wheel motor in accordance with an exemplary embodiment of the inventive concepts, FIG. 2 is a block diagram illustrating the cooling device for an in-wheel motor in accordance with the exemplary embodiment, FIG. 3 is a graph illustrating cooling performance when the amount of oil in the in-wheel motor in accordance with the exemplary embodiment is 250 ml, FIG. 4 is a graph illustrating cooling performance when the amount of oil in the in-wheel motor in accordance with the exemplary embodiment is 450 ml, and FIGS. 5 and 6 are diagrams illustrating the position where an oil tank in accordance with the exemplary embodiment is installed.

As illustrated in FIGS. 1 and 2, the cooling device 1 for an in-wheel motor in accordance with the exemplary embodiment may include a cooling circuit 20, an oil tank 30, a valve 40 and a controller 50. The cooling circuit 20 may form a flow path of oil in an in-wheel motor 10, the oil tank 30 may be connected to the cooling circuit 20 and supply oil to the cooling circuit 20 or store oil from the cooling circuit 20, the valve 40 may be installed in a pipeline connecting the cooling circuit 20 to the oil tank 30, and control movement of oil according to a control signal, and the controller 50 may receive a traveling condition of a vehicle and the temperature of the in-wheel motor 10, control the operation of the valve 40, and adjust the amount of oil flowing through the cooling circuit 20.

The cooling device 1 for an in-wheel motor in accordance with the exemplary embodiment may cool the in-wheel motor 10 by adjusting the amount of oil passing through the in-wheel motor 10. The cooling device in accordance with the exemplary embodiment may use a technique for controlling the entire amount of oil circulating through the in-wheel motor 10 according to the traveling condition of the vehicle, such as the speed or torque of the vehicle.

The cooling device in accordance with the exemplary embodiment can be applied to not only the in-wheel motor 10 including a decelerator to which a cooling system using oil is applied, but also the in-wheel motor 10 including no decelerator. The cooling device in accordance with the exemplary embodiment may be applied to a model which uses only the oil tank 30, a model which uses the oil tank 30 and an oil pump 70 together, and a model in which the oil tank 30 and the oil pump 70 are independently applied.

The model which uses only the oil tank 30 may be used when the maximum speed of the vehicle is relatively low as the in-wheel motor 10 is directly driven. When only the oil tank 30 is used without the oil pump 70, a cooling effect may be obtained by controlling the amount of oil circulating through the in-wheel motor 10 during driving.

In the model which uses the oil tank 30 and the oil pump 70 together, the oil tank 30 may be connected to an oil collection part of the in-wheel motor 10, and connected to the oil pump 70.

In the model in which the oil tank 30 and the oil pump 70 are independently applied, the oil tank 30 and the oil pump 70 may not be connected to each other, but installed at independent positions. Therefore, the oil tank 30 and the oil pump 70 may be independently operated. The oil pump 70 may be installed for lubrication to force oil to flow through the inside of the in-wheel motor 10, and the oil tank 30 which is operated separately from the operation of the oil pump 70 may control the amount of oil circulating through the in-wheel motor 10 through the valve 40.

The in-wheel motor 10 may include a stator 14, a rotor 16 and a motor shaft 12. The stator 14 may generate a magnetic field according to a current applied thereto, the rotor 16 may have a magnet inserted therein and rotate in the stator 14, and the motor shaft 12 may be connected to the rotor 16 and rotate with the rotor 16. The motor shaft 12 may have a hollow portion formed in the longitudinal direction thereof, and oil used as cooling oil may be moved along the hollow portion formed in the motor shaft 12.

The cooling circuit 20 may be formed in various shapes as long as the cooling circuit 20 forms a flow path of oil in the in-wheel motor 10. The cooling circuit 20 in accordance with the exemplary embodiment may include a hollow flow path 22 formed in the motor shaft 12 and a supply flow path 24 diverging from the hollow flow path 22 so as to supply oil to the stator 14, the decelerator 18 and the like.

The oil tank 30 may be modified in various shapes as long as the oil tank 30 is connected to the cooling circuit 20 and supplies oil to the cooling circuit 20 or stores oil from the cooling circuit 20. The oil tank 30 in accordance with the exemplary embodiment may not be connected to the oil pump 70, and the oil pump 70 and the valve 40 connected to the oil tank 30 may be independently operated.

The valve 40 may be installed on a pipeline connecting the cooling circuit 20 and the oil tank 30, and control the movement of oil according to a control signal. The valve 40 in accordance with the exemplary embodiment may include an inlet valve 42 and an outlet valve 44.

The inlet valve 42 may control a flow of oil moved from the in-wheel motor 10 toward the oil tank 30. The inlet valve 42 installed on a pipeline through which oil is moved from the in-wheel motor 10 to the oil tank 30 may be operated by the control signal of the controller 50, and open/close the flow path.

The outlet valve 44 may control a flow of oil moved from the oil tank 30 toward the in-wheel motor 10. The outlet valve 44 installed on a pipeline through which oil is moved from the oil tank 30 to the in-wheel motor 10 may be operated by the control signal of the controller 50, and open/close the flow path.

When the temperature of the in-wheel motor 10 is higher than a preset temperature, the controller 50 may send the control signal to close the inlet valve 42 and to open the outlet valve 44, thereby increasing the amount of oil in the in-wheel motor 10.

On the other hand, when the temperature of the in-wheel motor 10 is lower than the preset temperature, the controller 50 may send the control signal to open the inlet valve 42 and to close the outlet valve 44, thereby decreasing the amount of oil in the in-wheel motor 10.

The controller 50 may receive the traveling condition of the vehicle and the temperature of the in-wheel motor 10, control the operation of the valve 40, and adjust the amount of oil flowing through the cooling circuit 20. Furthermore, the controller 50 may control the operation of the in-wheel motor 10.

First and second measurement units 60 and 62 connected to the controller 50 may transfer information of the in-wheel motor 10 and the vehicle to the controller 50. The first measurement unit 60 may measure the temperature of the in-wheel motor 10 and transfer the measurement value to the controller 50. The second measurement unit 62 may measure the traveling speed and traveling state of the vehicle and transfer the measurement values to the controller 50.

The oil pump 70 may be connected to the cooling circuit 20 that forms a flow path for circulating oil through the in-wheel motor 10, and operated by the control signal of the controller 50, thereby transferring oil circulating through the cooling circuit 20.

As illustrated in FIGS. 1 and 2, the cooling device 1 for an in-wheel motor is a device for controlling the amount of oil circulating through the in-wheel motor 10 according to a driving condition of the vehicle or the like. Since the oil tank 30 and the oil pump 70 are mounted at separate positions, the valve 40 connected to the oil tank 30 may be independently controlled.

In the related art, the amount of oil circulated by the oil pump 70 is constant. In accordance with the inventive concepts, however, since the opening/closing of the valve 40 connected to the oil tank 30 is controlled, the amount of oil in the in-wheel motor 10 may be adjusted to increase the cooling efficiency.

In a direct drive type in which the in-wheel motor 10 does not include the decelerator 18, the oil tank 30 may be installed instead of the oil pump 70, and thus obtain a cooling effect by churning. That is, oil may be supplied to the stator 14 and the rotor 16, and cooling may be performed by churning while the oil is sprayed by the rotated rotor 16.

The method for controlling the speed of oil discharged from the oil pump 70 may be different from the method for controlling the amount of oil in the in-wheel motor 10.

As illustrated in FIGS. 3 and 4, a different test result may be obtained when the amount of oil circulating through the in-wheel motor 10 is differently applied under the same traveling condition and environment condition and the same operation condition of the oil pump 70.

As illustrated in FIG. 3, when the amount of oil in the in-wheel motor 10 is 250 ml, the internal temperature of the in-wheel motor 10 after 500 seconds may be 62° C. As illustrated in FIG. 4, when the amount of oil in the in-wheel motor 10 is 450 ml, the internal temperature of the in-wheel motor 10 after 500 seconds may be 57° C.

Based on the test result, a different cooling effect may be obtained by a difference in the amount of oil circulating through the in-wheel driving device.

When the oil tank 30 is installed to control the amount of oil circulating through the in-wheel motor 10 separately from the internal oil amount during the test, the cooling performance can be controlled according to the traveling condition of the vehicle.

That is, since the oil tank 30 is installed at an independent position to increase the amount of oil circulating through the in-wheel motor 10 separately from the operation of the oil pump 70, the cooling effect of the in-wheel motor 10 can be maximized by a difference in the amount of oil depending on the traveling condition of the vehicle.

As illustrated in FIGS. 5 and 6, when the cooling control method by the oil tank 30 without the oil pump 70 is applied, the oil tank 30 may be installed at a position where oil is collected in the in-wheel motor 10.

When the volume of oil in the in-wheel motor 10 is excessively large, heat may be generated by the rotation of the rotor 16. Thus, the cooling efficiency may be degraded.

Hereafter, a control method of the cooling device 1 for an in-wheel motor in accordance with an exemplary embodiment will be described in detail with reference to the accompanying drawings.

Figure 7:
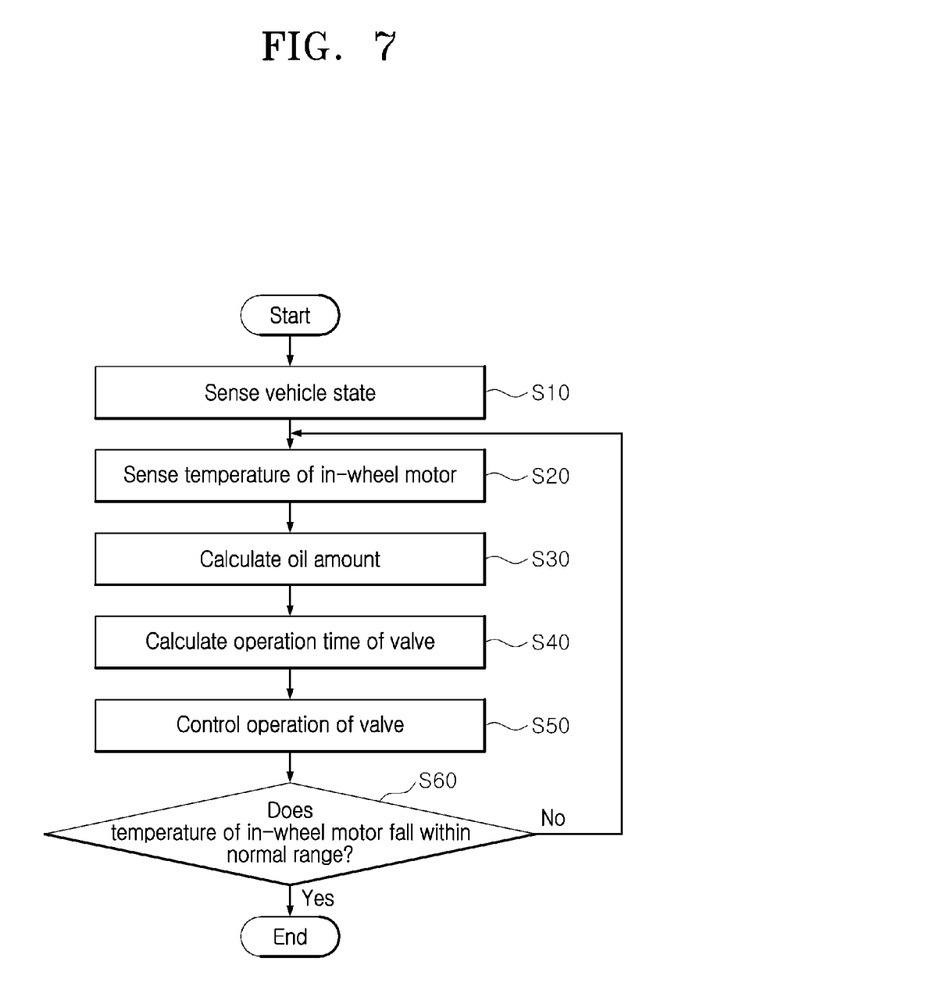
FIG. 7 is a flowchart illustrating a control method of the cooling device 1 for an in-wheel motor in accordance with an exemplary embodiment.

FIG. 7 is a flowchart illustrating a control method of the cooling device 1 for an in-wheel motor in accordance with an exemplary embodiment.

As illustrated in FIGS. 2 and 7, the control method of the cooling device 1 for an in-wheel motor in accordance with the exemplary embodiment may include a first sensing step S10 of sensing states of the vehicle. The controller 50 may sense various vehicle states including whether the vehicle is traveling or stopped, based on values transferred from the sensors.

The control method may include a second sensing step S20 of sensing a traveling condition of the vehicle and the temperature of the in-wheel motor 10. The first and second measurement units 60 and 62 connected to the controller 50 may transfer the information of the in-wheel motor 10 and the vehicle to the controller 50. The first measurement unit 60 may measure the temperature of the in-wheel motor 10 and transfer the measurement value to the controller 50, and the second measurement unit 62 may measure the traveling speed and traveling state of the vehicle, and transfer the measurement values to the controller 50.

The second measurement unit 62 may determine whether the vehicle is stopped or traveling, and determine whether the vehicle is traveling on a flat road or inclined road, when the vehicle is traveling.

The controller 50 may determine whether the vehicle is traveling at high or low speed and whether to raise the cooling effect, based on the transferred measurement values.

The control method may include a first calculation step S30 in which the controller 50 calculates the amount of oil to cool the in-wheel motor 10. The controller 50 may calculate the amount of oil required in the in-wheel motor 10, based on the values measured through the first and second measurement units 60 and 62 and the sensors installed in the vehicle.

The control method may include a second calculation step S40 in which the controller 50 calculates operation times of the inlet valve 42 and the outlet valve 44 which are installed on the pipeline connecting the in-wheel motor 10 and the oil tank 30. When the amount of oil in the in-wheel motor 10 needs to be increased, the controller 50 may decide how to set the operation times of the inlet valve 42 and the outlet valve 44. Alternatively, when the amount of oil in the in-wheel motor 10 needs to be decreased, the controller 50 may decide how to set the operation times of the inlet valve 42 and the outlet valve 44.

The control method may include a valve operation step S50 in which the operations of the inlet valve 42 and the outlet valve 44 are controlled according to the control signal of the controller 50. In order to decrease the amount of oil in the in-wheel motor 10, the inlet valve 42 connected to the oil tank 30 may be opened, and the outlet valve 44 connected to the oil tank 30 may be closed. Thus, the amount of oil in the oil tank 30 may be increased, and the amount of oil in the in-wheel motor 10 may be decreased.

In order to increase the amount of oil in the in-wheel motor 10, the inlet valve 42 connected to the oil tank 30 may be closed and the outlet valve 44 connected to the oil tank 30 may be opened, according to the control signal of the controller 50. Thus, the amount of oil in the oil tank 30 may be decreased, and the amount of oil in the in-wheel motor 10 may be increased.

When the temperature of the in-wheel motor 10 is higher than the preset temperature, the controller 50 may send the control signal to close the inlet valve 42 and to open the outlet valve 44. Therefore, the oil in the oil tank 30 may be supplied to the in-wheel motor 10, and thus increase the amount of oil in the in-wheel motor 10. On the other hand, when the temperature of the in-wheel motor 10 is lower than the preset temperature, the controller 50 may send the control signal to open the inlet valve 42 and to close the outlet valve 44. Thus, the amount of oil stored in the oil tank 30 may be increased to decrease the amount of oil in the in-wheel motor 10.

When the temperature of the in-wheel motor 10 is equal to the preset temperature, the controller 50 may send the control signal to close the inlet valve 42 and the outlet valve 44.

The control method may further include a determination step S60 of checking a cooling effect in the in-wheel motor 10 and determining whether the temperature of the in-wheel motor 10 falls within a normal range. In the determination step, the controller 50 may check whether the temperature of the in-wheel motor 10 rises or falls, based on the measurement values of the first and second measurement units 60 and 62 and the measurement values of various sensors.

Then, the controller 50 may determine whether to end the valve operation or to return to the second sensing step S20 of sensing the temperature of the in-wheel motor 10.

The present invention relates to the cooling device 1 for an in-wheel motor, and more specifically, to the technique for controlling the amount of oil in the in-wheel motor 10 through the valve 40 connected to the oil tank 30 according to the vehicle traveling condition such as the speed and torque of the vehicle.

When the vehicle travels at low speed and high torque, it may indicate an instant overload condition in which a considerable amount of heat is generated by the in-wheel motor 10. Therefore, in order to raise the cooling effect, the amount of oil circulated through the in-wheel motor 10 needs to be increased.

Furthermore, when the vehicle travels at high speed and low torque, it may indicate a light load condition in which the cooling effect can be obtained even by a small amount of oil. Therefore, the cooling device may decrease the amount of oil circulating through the in-wheel motor 10, thereby reducing a loss caused by churning while increasing the cooling efficiency.

In accordance with an exemplary embodiment of the inventive concepts, the controller 50 may control the operations of the valve 40 connected to the oil tank 30 according to the vehicle traveling condition. Thus, the amount of oil circulating through the in-wheel motor 10 may be automatically adjusted to cool the in-wheel motor 10, thereby improving the endurance of the parts constituting the in-wheel motor 10 and the cooling efficiency of the in-wheel motor 10. Furthermore, the cooling effect of the in-wheel motor 10 can be increased by controlling the amount of oil according to each vehicle traveling condition, which makes it possible to improve the system efficiency. Furthermore, the in-wheel motor 10 to which the high-efficiency cooling system is applied can be applied to a suspension in a suspension system. Furthermore, the in-wheel motor 10 can be easily applied and manufactured, and contribute to improving fuel efficiency.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A cooling device for an in-wheel motor, the cooling device comprising:
   a cooling circuit configured to form a flow path of oil in the in-wheel motor;
   an oil tank connected to the cooling circuit, and configured to supply oil to the cooling circuit or store oil from the cooling circuit;
   a valve unit installed in a pipeline connecting the cooling circuit to the oil tank, the valve unit comprising an inlet valve configured to control a flow of oil from the in-wheel motor toward the oil tank, and an outlet valve configured to control a flow of oil from the oil tank toward the in-wheel motor; and
   a controller configured to receive a traveling condition of a vehicle and a temperature of the in-wheel motor, and provide a control signal to the valve unit based on the received traveling condition of the vehicle and the received temperature of the in-wheel motor to control an operation of the inlet and outlet valves so as to adjust an amount of oil flowing through the cooling circuit.

2. The cooling device of claim 1, wherein the flow path of oil in the in-wheel motor comprises:
a hollow flow path having a hollow portion formed in a longitudinal direction of a motor shaft, such that oil is moved therethrough; and
a supply flow path diverging from the hollow flow path so as to supply oil to a decelerator and a stator of the in-wheel motor.

3. The cooling device of claim 1, further comprising:
a first measurement unit configured to measure the temperature of the in-wheel motor and transfer the measured temperature to the controller; and
a second measurement unit configured to determine the traveling condition of the vehicle by measuring a traveling speed and a traveling state of the vehicle, and transfer the measured traveling speed and the measured traveling state to the controller,
wherein measuring the traveling state of the vehicle includes determining whether the vehicle is stopped or traveling and, if the vehicle is traveling, whether the vehicle is traveling on a flat or inclined surface.

4. The cooling device of claim 3, wherein when the measured temperature of the in-wheel motor is higher than a preset temperature, the controller sends the control signal to close the inlet valve and to open the outlet valve.

5. The cooling device of claim 3, wherein when the measured temperature of the in-wheel motor is lower than the preset temperature, the controller sends the control signal to open the inlet valve and to close the outlet valve.

6. The cooling device of claim 1, further comprising an oil pump connected to the cooling circuit, operated by the controller, and configured to force oil to circulate through the cooling circuit.

7. A control method of a cooling device for an in-wheel motor, the control method comprising:
a first sensing step of sensing a traveling condition of a vehicle;
a second sensing step of sensing a temperature of the in-wheel motor;
a first calculation step in which a controller calculates an amount of oil required to cool the in-wheel motor;
a second calculation step in which the controller calculates operation times of an inlet valve and an outlet valve in a valve unit, the valve unit installed in a pipeline connecting the in-wheel motor to an oil tank; and
a valve operation step in which opening and closing operations of the inlet valve and the outlet valve are controlled by a control signal provided to the valve unit from the controller based on the first and second sensing steps and the first and second calculation steps.

8. The control method of claim 7, wherein when the sensed temperature of the in-wheel motor is higher than a preset temperature, the controller sends the control signal to the valve unit to close the inlet valve and to open the outlet valve.

9. The control method of claim 7, wherein when the sensed temperature of the in-wheel motor is lower than the preset temperature, the controller sends the control signal to the valve unit to open the inlet valve and to close the outlet valve.

* * * * *